United States Patent [19]

Rasshofer et al.

[11] Patent Number: 4,707,502

[45] Date of Patent: Nov. 17, 1987

[54] PROCESS FOR THE PRODUCTION OF URETHANE-MODIFIED POLYISOCYANATE PREPARATIONS, THE POLYISOCYANATE PREPARATIONS OBTAINABLE BY THIS PROCESS AND THEIR USE IN THE PRODUCTION OF PLASTICS BASED ON POLYISOCYANATES

[75] Inventors: Werner Rasshofer, Cologne; Otto Ganster, Odenthal; Brund Luckas, Leverkusen; Ludwig Rottmaier, Odenthal-Gloebusch, all of Fed. Rep. of Germany

[73] Assignee: Bayer Aktiengesellschaft, Leverkusen, Fed. Rep. of Germany

[21] Appl. No.: 889,037

[22] Filed: Jul. 23, 1986

[30] Foreign Application Priority Data

Aug. 1, 1985 [DE] Fed. Rep. of Germany ....... 3527531

[51] Int. Cl.$^4$ .............................................. C08G 18/14
[52] U.S. Cl. .................................... 521/159; 521/161; 528/60; 528/65; 528/73; 544/221; 548/264
[58] Field of Search ................. 521/159, 161; 528/60, 528/65, 73; 544/221; 548/264

[56] References Cited

U.S. PATENT DOCUMENTS

| | | | |
|---|---|---|---|
| 3,644,457 | 2/1972 | Konig et al. | 260/453 |
| 3,883,571 | 5/1975 | Allport et al. | 260/453 |
| 4,031,026 | 6/1977 | Ibbotson | 252/182 |
| 4,031,040 | 6/1977 | Den Otter et al. | 260/2.6 |
| 4,055,548 | 10/1977 | Carleton et al. | 260/77.5 |
| 4,115,429 | 9/1978 | Reiff et al. | 260/453 |
| 4,118,411 | 10/1978 | Reiff et al. | 260/453 |
| 4,125,545 | 11/1978 | Kroplinski et al. | 260/404.5 |
| 4,229,347 | 10/1980 | Holt et al. | 260/239 |
| 4,234,714 | 11/1980 | Earing et al. | 528/67 |
| 4,261,852 | 4/1981 | Carroll et al. | 528/59 |
| 4,281,095 | 7/1981 | Dunwald et al. | 528/49 |
| 4,293,669 | 10/1981 | Rottmaier et al. | 525/452 |
| 4,321,333 | 3/1982 | Alberino et al. | 521/159 |
| 4,381,388 | 4/1983 | Naples | 528/159 |

FOREIGN PATENT DOCUMENTS

| | | |
|---|---|---|
| 1129599 | 8/1982 | Canada . |
| 1178603 | 11/1984 | Canada . |
| 45-11146 | 4/1970 | Japan . |
| 48-26028 | 4/1973 | Japan . |
| 53-50187 | 5/1978 | Japan . |
| 1369334 | 10/1974 | United Kingdom . |
| 1430455 | 3/1976 | United Kingdom . |
| 1444192 | 7/1976 | United Kingdom . |
| 1450660 | 9/1976 | United Kingdom . |
| 1577767 | 10/1980 | United Kingdom . |

*Primary Examiner*—Maurice J. Welsh
*Attorney, Agent, or Firm*—Gene Harsh; Joseph C. Gil

[57] ABSTRACT

The present invention relates to a process for the production of urethane modified polyisocyanate preparations having an isocyanate content of 5 to 32% by weight by the reaction of (a) polyisocyanates of the diphenylmethane series or polyisocyanate mixtures of the diphenylmethane series with (b) organic polyhydroxyl compounds using an NCO/OH equivalent ratio of from 2.5:1 to 50:1, characterized in that the organic polyhydroxyl compound (b) used are:

(b1) urazoles or isocyanurates having OH numbers in the range of from 168 to 721 containing 2 or 3 alcoholic hydroxyl groups and carrying hydroxyalkyl substituents, optionally with ether bridges, on the nitrogen, or mixtures thereof, or (b2) mixtures of the polyhydroxyl compound mentioned under b1) with up to 50 hydroxy equivalents percent of other organic polyhydroxyl compounds.

5 Claims, No Drawings

PROCESS FOR THE PRODUCTION OF URETHANE-MODIFIED POLYISOCYANATE PREPARATIONS, THE POLYISOCYANATE PREPARATIONS OBTAINABLE BY THIS PROCESS AND THEIR USE IN THE PRODUCTION OF PLASTICS BASED ON POLYISOCYANATES

This invention relates to a new process for the production of novel urethane-modified polyisocyanate preparations which are particularly valuable starting materials for the production of plastics based on polyisocyanates, the polyisocyanate preparations obtainable by this process, and their use for the production of such plastics.

The production of urethane modified polyisocyanate preparations, i.e. of prepolymers or semi-prepolymers containing isocyanate end groups, in particular on the basis of polyisocyanates and polyisocyanate mixtures of the diphenylmethane series (4,4'-diisocyanatodiphenylmethane and mixtures thereof with 2,4'- and optionally 2,2'-diisocyanatodiphenylmethane or phosgenation products of aniline/formaldehyde condensates containing the higher homologues of these diisocyanates as well as the diisocyanates themselves) and a wide variety of polyhydroxyl compounds is already known (see e.g. EP-A-10 850 or 66 130; DE-OS 2 347 207, 2 404 166, 2 513 793, 2 513 796, 2 620 222, 2 622 104, 2 732 182, 2 737 338, 2 804 375, 2 810 596, 2 815 579 or 2 913 126; U.S. Pat. No. 3,644,457, 4,055,548, 4,234,714 or 4,321,333 or GB-PS 1 369 334).

Processes disclosed in these prior publications are generally concerned with the liquefaction of diisocyanatodiphenylmethanes which are solid at room temperature, in particular 4,4'-diisocyanatodiphenylmethane, or the reduction of the tendency of polyisocyanate mixtures of the diphenylmethane series which are liquid at room temperature to crystallize when stored at low temperatures.

It has now surprisingly been found that urethane modified polyisocyanate preparations based on polyisocyanates or polyisocyanate mixtures of the diphenylmethane series and alkoxylation products or urazole compounds and triazine compounds of the type to be mentioned below not only constitute compositions which have a reduced melting point and reduced tendency to crystallisation in storage at low temperatures but may also advantageously be used for the production of plastics based on polyisocyanates, in particular polyurethane moulded products with a homogeneous surface, which are distinguished by substantially improved mechanical properties, in particular a high rigidity and improved heat resistance combined with good green strength, a high elongation at break and high elasticity.

The use of derivatives of urazole (=1,2,4-triazolidine-3, 5-dione) and derivatives of isocyanurate is already known in polyurethane chemistry.

Thus, according to the teaching of DE-OC 2 908 626, hydroxyl-containing polyesters obtained from tris(hydroxyalkyl)-1, 2,4-triazolidine-3,5-diones and dicarboxylic acids, optionally together with pure tris(hydroxyalkyl)-1, 2,4-triazolidine-3,5-dione, may be used together with polyisocyanates for the production of wire lacquers and other coatings. Hydroxyalkyl-substituted isocyanurates are used for the preparation of crosslinking agents which can be activated by atmospheric moisture (U.S. Pat. No. 4,381,388) or as components of wire lacquers (DE-OS 2 854 412). DE-OS 2 527 580 teaches the use of tris-(hydroxymethyl)-isocyanurate for the production of polyisocyanurate foams. Japanese Patent Application 66-081254 (Publication No. 7011146) teaches the preparation of solid resins from tris-(2-hydroxyalkyl)-isocyanurate and polyisocyanates such as tolylene diisocyanate, phenylene diisocyanate or hexamethylene diisocyanate. Japanese Patent Application 53 050 187 (Disclosure No. 124 574) teaches the preparation of similar reaction products using phosphoric acid esters as solvents. Japanese Patent Application No. 091 413 (Publication No. 73 26 028) teaches a similar reaction using special ether-esters as solvents.

The above mentioned prior publications, however, do not disclose that isocyanate group-containing prepolymers and semiprepolymers based on polyisocyanates or polyisocyanate mixtures of the diphenylmethane series and urazole or isocyanurate derivatives containing alcoholic hydroxyl groups of the type used as component (b) in the process according to the invention constitute compositions which have a lower melting point and reduced tendency to crystallization when stored at low temperatures, nor that they are particularly advantageous for the production of plastics based on polyisocyanates, in particular polyurethane moulded products with a homogeneous surface.

The present invention relates to a process for the production of urethane-modified polyisocyanate preparations having an isocyanate content of from 5 to 32% by weight by the reaction of (a) polyisocyanates of the diphenylmethane series or polyisocyanate mixtures of the diphenylmethane series with (b) organic polyhydroxyl compounds, using an NCO/OH equivalent ratio of from 2.5:1 to 50:1, characterised in that the organic polyhydroxyl compounds (b) used are (b1) urazoles or isocyanurates in the OH range of from 168 to 721 or mixtures thereof containing two or three alcoholic hydroxyl groups and carrying hydroxyalkyl substitutents, optionally with ether bridges, on the nitrogen, or (b2) mixtures of the polyhydroxyl compounds mentioned under b1) with up to 50 hydroxy equivalents percent of other organic polyhydroxyl compounds.

The invention also relates to polyisocyanate preparations obtained by this process.

Lastly, the invention also relates to the use of the polyisocyanate preparations obtained by this process as isocyanate components for the production of polyisocyanate-based plastics selected from the group of polyurethane plastics, polyisocyanurate plastics and isocyanurate-modified polyurethane plastics.

The compounds used as starting materials a) are polyisocyanates or polyisocyanate mixtures of the diphenylmethane series. These may be 4,4'-diisocyanatodiphenylmethane, mixtures thereof with 2,4'- and optionally 2,2'-diisocyanatodiphenylmethane containing up to 70% by weight, preferably up to 20% by weight of 2,4'-diisocyanatodiphenylmethane, based on the total mixture, the proportion of 2,2'-diisocyanatodiphenylmethane generally not exceeding 5% by weight, and polyisocyanates of the kind which may be obtained by the phosgenation of aniline/formaldehyde condensates and which may contain varying quantities of higher homologues of polyisocyanates (generally 5 to 60% by weight, based on the total mixture) in addition to the diisocyanatodiphenylmethane isomers of the type mentioned above.

Component (b) may consist of (b1) urazoles or isocyanurates containing two or three hydroxyl groups and having hydroxyl numbers in the range of 168–721, preferably 373 to 721, or mixtures of such compounds, or (b2) mixtures of (b1) with up to 50 hydroxyl equivalents percent, based on all the hydroxyl compounds, of other polyhydroxyl compounds.

Typical polyhydroxyl compounds of this kind which may be used as component (b1) in the process according to the invention correspond to formula (I)

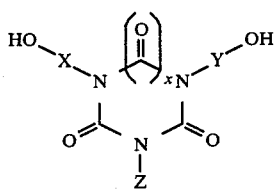
(I)

wherein

X and Y may be indentical or different but are preferably identical and represent a straight chained or branched alkylene group having 2 to 6 carbon atoms and optionally carrying ether oxygen atoms, preferably an ethylene or 2-propylene group (when X=0) or a 2-propylene group (when X =1), represents a straight chained or branched alkyl group with 1 to 16 carbon atoms, preferably 1 to 4 carbon atoms, optionally carrying isocyanate inert substitutents, a cycloalkyl group with 4 to 15 carbon atoms optionally carrying isocyanate inert substituents, preferably a cyclohexyl group, an aryl group with 6 to 14 carbon atoms optionally carrying isocyanate inert substituents, preferably a phenyl group, or an aralkyl or alkaryl group with 7 to 15 carbon atoms optionally carrying isocyanate inert substituents, a group of the formula —X—OH being particularly preferred, and x stands for 0 or 1, X, Y, Z and x being chosen to result in an OH number within the range of from 168–721, preferably from 373 to 721.

The compounds corresponding to the general formula (I) may be prepared, for example, by alkoxylation of the basic compound of formula (II)

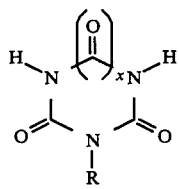
(II)

wherein

R represents hydrogen or an inert group of the type mentioned in the definition of Z and x stands for 0 or 1.

This alkoxylation is carried out using alkylene oxides such as ethylene oxide, propylene oxide, 1,2- or 2,3-butylene oxide, the isomeric pentylene oxides, the isomeric hexylene oxides or tetrahydrofuran, preferably propylene oxide (when x=1) or ethylene or propylene oxide (when x=0).

The compounds corresponding to formula II have been disclosed in German Offenlegungsschriften Nos. 2 909 627, 2 947 619, 2 935 354, 3 027 611, 3 027 551, 3 027 623 and 3 027 612.

The starting compound corresponding to formula II in which x=0 and R=hydrogen, i.e. 1,2,4-triazolidine-3,4-dione, may be prepared from hydrazodicarbonamide (=N,N'-bis-(aminocarbonyl)-hydrazine) suspended in an organic, optionally water-miscible solvent such a N-methylpyrrolidone by cyclisation at temperatures of from 150° C. to 280° C. and a pressure from 50 mbar to 5 bar with liberation of ammonia and removal of the liberated ammonia from the reaction mixture, and may then be isolated by crystallisation (see DE-OS 2 947 619).

Starting compounds corresponding to formula II in which x=0 and R is a monovalent organic group may be prepared by the procedures described above from hydrazodicarbonamide, and a primary monoamine with liberation of ammonia, preferably using from 0.9 to 1.1 mol of hydrazodicarbonamide to one primary amino group (see DE-OS 3 027 611 and 3 027 612).

Addition of the alkylene oxide to the NH groups of the 1,2,4-triazolidine-3,5-diones (II, x=0) may be carried out in the presence of acid or alkaline catalysts although the catalysts used for the preparation of polyols corresponding to formula I are preferably compounds such as tetraethylammonium chloride, tertiary amines such as triethylamine or dimethylaniline or alkali metal or alkaline earth hydroxides or carbonates such as calcium hydroxide or potassium carbonate. Alkali metal halides such as lithium chloride may also be used. The quantity of catalyst used is in the range of from 0.05 to 3%, based on the reactants.

A preferred method is the addition of 1 mol of alkylene oxide per NH group without the use of a catalyst.

The reaction with alkylene oxide is preferably carried out in an inert organic solvent. Polar organic solvents such as dimethylsulphoxide, tetramethylenesulphone, dimethylformamide, dimethylacetamide or N-methylpyrrolidone-2 are particularly suitable. Water is also a very suitable solvent and it is surprisingly found that the ethylene oxide does not react with the water. The reaction may also be carried out in suspension, in which case the polyol formed goes into solution so that the end of the reaction is indicated by the formation of a clear solution. If desired, the product to be oxalkylated and the alkylene oxide may together be added to the polyol solution which is in the process of formation, whereby the quantity of solvent can be kept very low. It is desirable for economic reasons to keep the quantity of solvent low and it may be as low as 0.4 to 20% by weight of solvent, based on 1 part by weight of reactants. After termination of the reaction, the solvent is removed by application-of a vacuum and the viscous residue may be purified by one of the usual methods such as recrystallisation although purification may frequently be omitted and the crude product worked up directly.

The reaction is preferably carried out at temperatures from 25° C. to 200° C., most preferably at 80° C. to 150° C.

The reaction times are generally from 30 minutes to several days but may in special cases be above or below these limits. Shorter reaction times are achieved by suitable choice of the reaction conditions, e.g. the pressure (see DE-OS 2 908 627 and DE-OS 3 027 551).

Compounds (b1) of formula I in which x stands for 1 are prepared by a method analogous to that described above. Suitable methods of preparation are described, for example, in U.S. Pat. No. 3,088,948 and in J.Org.-Chem. 28, pages 85–89 (1963).

The following are preferred starting materials (b1): 1,2,4-Tris-(2-hydroxyethyl)-urazole, 1,2,4-tris-(2-hydroxypropyl)-urazole, 1,2-bis-(2-hydroxyethyl)-4-methyl-, -4-ethyl-, -4-n-butyl-, -4-cyclohexyl- and -4-phenylurazole and the corresponding 1,2-bis-(2-hydroxypropyl)-urazoles and N,N',N"-tris-(2-hydroxypropyl)-isocyanurate.

Instead of using component (b1) alone, mixtures (b2) of the compounds exemplified under (b1) with up to 50 hydroxy equivalents percent of other polyhydroxyl compounds, based on the total quantity of polyhydroxyl compounds, may be used in the process according to the invention. These other compounds are the known polyhydroxyl compounds of polyurethane chemistry, i.e. the following:

1. Low molecular weight polyhydroxyl compounds in the molecular weight range of from 62 to 499, e.g. ethylene glycol, propylene glycol, hexamethylenediol, trimethylolpropane, diethyleneglycol, triethyleneglycol, dipropyleneglycol, tripropyleneglycol and polypropyleneglycols within the molecular weight range indicated above or any mixtures of such polyhydric alcohols, and/or
2. higher molecular weight polyhydroxyl compounds, in the molecular weight range of from 500 to 6000, i.e. the polyhydroxy polyesters and polyethers known from polyurethane chemistry, which preferably have a hydroxyl functionality of from 2 to 5, in particular 2 or 3 and which have been described, for example, in US-PS 4 065 410.

The starting polyisocyanates could in principle be reacted successively, first with the urazole and isocyanurate compounds according to the invention, in particular the compounds corresponding to the general formula (I), and then with the above mentioned other polyhydroxyl compounds or in the reverse sequence but the process according to the invention is preferably carried out with urazole and/or isocyanurate compounds (b1) alone, in particular compounds of the general formula I.

In the process according to the invention, the reactants are used in the quantities corresponding to an equivalent ratio of isocyanate groups to hydroxyl groups of the urazole and isocyanurate compounds, in particular compounds of formula (I) with the optional addition of other polyhydroxyl compounds, in the range of from 2.5:1 to 50:1, preferably 4:1 to 20:1.

The process according to the invention is generally carried out within a temperature range of from 20° to 140° C., preferably 40° to 120° C. The reaction is generally carried out by adding all the reactants together at room temperature and then heating them to a maximum of 140° C., preferably 40° C. to 100° C., until the calculated isocyanate content has been reached. In some cases, especially when the hydroxyl component has a relatively high melting point and low solubility in the polyisocyanate, it may be preferable first to introduce the starting polyisocyanate or polyisocyanate mixture into the reaction vessel and heat it to a temperature of, say, 40° to 140° C., preferably 80° to 120° C., and then to add the polyhydroxyl component either all at once or portionwise, preferably portionwise. Care should be taken to ensure that the temperature of the contents of the reaction vessel does not exceed the upper limit of 140° C. in order that side reactions such as trimerisation of the isocyanate groups may be avoided. The resulting polyisocyanate preparations containing urethane groups are generally so-called semiprepolymers, i.e. mixtures of unreacted starting polyisocyanates with urethane-modified isocyanate prepolymers. It is only when low NCO/OH equivalent ratios within the above mentioned ranges are used that the product of the process according to the invention consists virtually exclusively of true isocyanate prepolymers containing only very small quantities of unreacted starting polyisocyanate. The products according to the invention generally have an isocyanate content within the wide range of from 5 to 32% by weight, depending on the nature of the starting polyisocyanate (a) and of the hydroxyl-containing reactant (b) and on the proportions in which the reactants are put into the process. If, as is preferred, starting materials (b1) alone are used as reactants for the polyisocyanate (a), the process according to the invention gives rise to urethane-modified polyisocyanate preparations having an NCO content of from 25 to 32% by weight.

The products obtained by the process according to the invention generally have a lower melting point than the corresponding starting polyisocyanates. They may advantageously be used, optionally in admixture with other polyisocyanates known in polyurethane chemistry, for the production of polyisocyanate based plastics selected from the group of polyurethane plastics, polyisocyanurate plastics and isocyanurate-modified polyurethane plastics. The term "polyurethane plastics" used in this context also includes polyurethanes containing urea groups obtained from polyisocyanates and polyhydroxyl compounds with the addition of polyamines. The products of the process according to the invention are particularly advantageous polyisocyanate components for the production of moulded plastics by the "RIM process", both for the production of rigid, semi-rigid and flexible integral foams and for the production of the corresponding solid, including microcellular moulded products having a gross density in the range of 0.8 to 1.4 g/cm$^3$, preferably 0.9 to 1.2 g/cm$^3$.

For this purpose, the products according to the invention may be used instead of or together with the polyisocyanates conventionally used for this purpose. This means in particular that for this use according to the invention, the reactants and auxiliary substances as well as other parameters of the process conform to the state of the art as disclosed, for example, in German Offenlegungsschriften Nos. 1 953 637, 2 121 670, 2 356 692, 2 363 452, 2 404 310, 2 427 273, 2 431 968, 2 307 589, 2 319 648 and 3 012 126, U.S. Pat. Nos. 4,065,410 and 4,218,543 and published European Patent Applications (Publication Nos.) 17 928, 44 481 and 81 701.

The products according to the invention may, of course, also advantageously be used as polyisocyanate components for the preparation of other polyurethane products, e.g. for the preparation of rigid, semi-rigid or flexible polyurethanes foamed in open moulds, either instead of or together with the polyisocyanates hitherto used for this purpose. High quality polyisocyanurate plastics may also be produced by known processes in which the products of the process according to this invention are used as polyisocyanates components.

The plastics produced with the products according to the invention are distinguished by their excellent mechanical properties. They are suitable in principle for the same fields of application as the state of the art plastics.

In the examples which follow, all the percentages are percentages by weight and parts are parts by weight.

EXAMPLES

Example 1

2408 g of a polyisocyanate having an isocyanate content of about 31% are introduced into the reaction vessel at 80° C. This polyisocyanate was obtained from the crude phosgenation product of an aniline/formaldehyde condensate by removing from it by distallation the quantity of diisocyanatodiphenylmethane necessary to leave a distallation residue having a viscosity of 100 mPas/25° C. (dinuclear content: about 60%, trinuclear content: about 21%, proportion of higher nuclear polyisocyanates: about 19%). 87 g of 1,2-bis-(2-hydroxypropyl)-4-cyclohexyl-urazole are added in three portions over a period of 45 minutes and the reaction mixture is stirred for 3 hours at 80° C. and then for 3 hours at 100° C. Isocyanate content: 29.2% (theoretical: 29.0%), viscosity (25° C.) 980 mPas.

Example 2

2425 g of the polyisocyanate mixture from Example 1 are introduced into the reaction vessel at 80° C. 75 g of 1,3,5-tris-(2-hydroxypropyl)-isocyanurate which has previously been heated to 60° C. is added in three portions over a period of 45 minutes. The mixture is then stirred for 3 hours at 80° C. Isocyanate content: 28.9% (theoretical: 29.0%), viscosity (25° C.): 1320 mPas.

Example 3

3.1 105 g of Tris-(2-hydroxyethyl)-urazole and 1500 g of 4,4'-diisocyanatodiphenylmethane are stirred for 5 hours at 80° C.

3.2 50 g of 1,2,4-Tris-(2-hydroxyethyl)-urazole and 1500 g of a polyisocyanate mixture of the diphenylmethane series are stirred together for 5 hours at 80° C. The polyisocyanate mixture used is a phosgenation product of an aniline/formaldehyde condensate having an isocyanate content of 31%, a viscosity at 25° C. of 60 mPas, a 2,4,'-diisocyanatodiphenylmethane content of 7%, a 4,4'-diisocyanatodiphenylmethane content of 68% and a higher nuclear polyisocyanate content of 25%.

3.3 The modified polyisocyanates described under 3.1 and 3.2 are mixed together to form an overall mixture having an isocyanate content of 27.6% and a viscosity at 25° C. of 1420 mPas.

Example 4

1800 g of the starting polyisocyanate from Example 3.2 and 123.6 g of 1,2,4-tris-(2-hydroxyethyl)-urazole are stirred together for 4 hours at 110° C. and 2 hours at 140° C. A polyisocyanate preparation according to the invention having an isocyanate content of 28.4% (theory: 28.5%) and a viscosity at 25° C. of 1105 mPas is obtained.

Example 5

104 g of 1,2,4-Tris-(2-hydroxyethyl)-urazole and 2450 g of a polyisocyanate mixture of the diphenylmethane series are stirred together for 8 hours at 90° C. The polyisocyanate mixture used is a phosgenation product of an aniline/formaldehyde condensate having an isocyanate content of 31% and containing 10% of 2,4'-diisocyanatodiphenylmethane, 80% of 4,4'-diisocyanatodiphenylmethane and 10% of higher nuclear polyisocyanates. A polyisocyanate preparation according to the invention having an isocyanate content of 28.4% and a viscosity at 25° C. of 1105 mPas is obtained.

Example 6 (Example of practical application)

The following example of practical application illustrates the preparation of a rigid moulded polyurethane foam with compact surface layer using the polyisocyanate preparation according to the invention described in Example 3.3. The comparison example carried out at the same time concerns the preparation of an analogous moulded product using a conventional commercial polyisocyanate mixture.

To carry out the experiments, components A and B are brought together, mixed mechanically at room temperature (10 seconds) and then introduced into a mould which has been heated to 60° C. The mould is a steel platform measuring 20×20×1 cm. The dwell time in the mould is in both cases 5 minutes. The internal walls of the mould were coated with a commercial mould release agent based on wax (Mould release agent P180 of Acmos, Bremen) before the experiments are carried out.

Component A consisted in both cases of a mixture of
- 80 parts of an addition product of ethylene oxide and trimethylolpropane, OH number 550,
- 19 parts of a polyester of trimethylolpropane, oleic acid, phthalic acid anhydride and adipic acid, OH number 370 and acid number 1,
- 6 parts of an amide ammonium salt of 2 mol of tall oil and 1 mol of 3-dimethylaminopropylamine,
- 1 part of an addition product of propylene oxide and ethylene diamine, OH number 490,
- 0.8 part of a commercial polysiloxane stabilizer (Stabilizer PU 1836 of BAYER AG, Leverkusen),
- 0.15 part of pentamethyldiethylene triamine,
- 0.1 part of 85% phosphoric acid, and
- 6 parts of trichlorofluoromethane.

The polyisocyanate preparation of Example 3.3 was used as component A in the example according to the invention, as already mentioned.

Component B used in the comparison example consisted of a mixture of
(i) 50 parts of a polyisocyanate having an isocyanate content of 24.5% prepared by the reaction of the starting polyisocyanate mentioned in Example 5 with a polypropylene glycol having the OH number 515 and
(ii) 50 parts of the starting polyisocyanate used in Example 3.2.

The mixture of A and B has an isocyanate index of about 119 in both examples. The resulting data are shown in the Table below:

|  | | Mechanical data: | | |
| --- | --- | --- | --- | --- |
|  | DIN | Comparison | According to the invention | Dimension |
| Gross density | 53 420 | 606 | 608 | kg/m³ |
| Flexural strength | 53 423 | 43.6 | 47.1 | MPa |
| Modulus in flexure | 53 423 | 1,152 | 1,228 | MPa |
| Impact strength | 53 453 | 14.5 | 10.6 | kJ/m² |
| Shore D hardness | 53 505 | 69–72 | 73–75 | — |
| WB (10 mm deflection) | 53 424 | 76 | 90 | °C. |

| | DIN | Comparison | According to the invention | Dimension |
|---|---|---|---|---|
| Shrinkage[1] | | 0.33 | 0.32 | % |

[1] applies to 10 mm plates having a gross density of 600 kg/m³ at 60° moulding temperature and 5 min. dwell time in the mould.

We claim:

1. Process for the production of urethane modified polyisocyanate preparations having an isocyanate content of 5 to 32% by weight by the reaction of
   (a) polyisocyanates of the diphenylmethane series or polyisocyanate mixtures of the diphenylmethane series with
   (b) organic polyhydroxyl compounds
   using an NCO/OH equivalent ratio of from 2.5:1 to 50:1, characterized in that the organic polyhydroxyl compounds (b) used are
   (b1) urazoles or isocyanurates having OH numbers in the range of from 168 to 721 containing 2 or 3 alcoholic hydroxyl groups and carrying hydroxyalkyl substituents, optionally with ether bridges, on the nitrogen, or mixtures thereof, or
   (b2) mixtures of the polyhydroxyl compounds mentioned under b1) with up to 50 hydroxy equivalents percent of other organic polyhydroxyl compounds.

2. Process according to claim 1, characterised in that the compounds used as component (b1) correspond to formula (I)

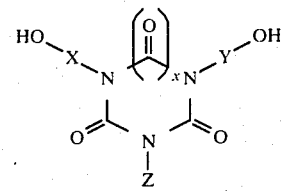

wherein
X and Y are identical or different and represent a straight chained or branched alkylene group having 2 to 6 carbon atoms
Z represents an alkyl group with 1 to 4 carbon atoms optionally carrying isocyanate inert substituents, a cyclohexyl or phenyl group or a group of the formula —X—OH, and
x represents 0 or 1,
X, Y, Z and x being so chosen that the compounds have a hydroxyl number within the range of from 168 to 721.

3. Process according to claim 2 characterized in that X, Y and Z are identical and consist of ethylene or 1,2-propylene groups when x=0 and of 1,2-propylene groups when x=1, and x stands for 0 or 1.

4. Polyisocyanate preparations obtained according to claims 1 to 3.

5. In the preparation of a polyisocyanate based plastic selected from the group of polyurethane plastics, polyisocyanurate plastics, and isocyanurate-modified polyurethane plastics by the reaction of a isocyanate component either with itself and/or with an active hydrogen containing compound, the improvement wherein the isocyanate component used is the isocyanate of claim 4.

* * * * *